UNITED STATES PATENT OFFICE.

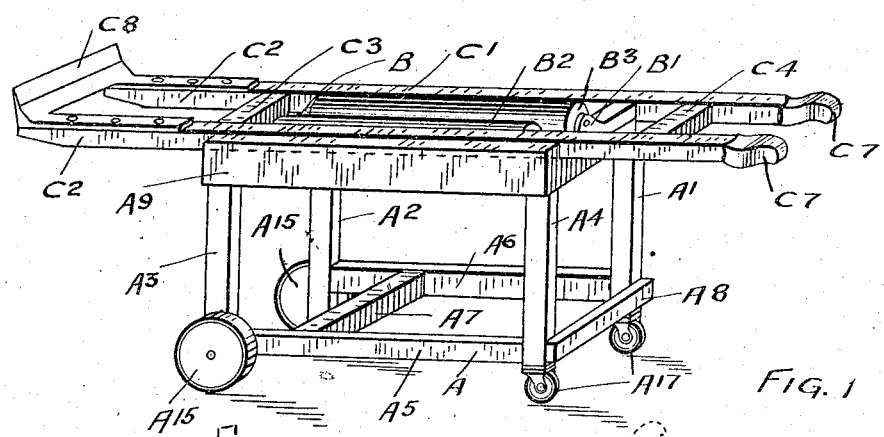
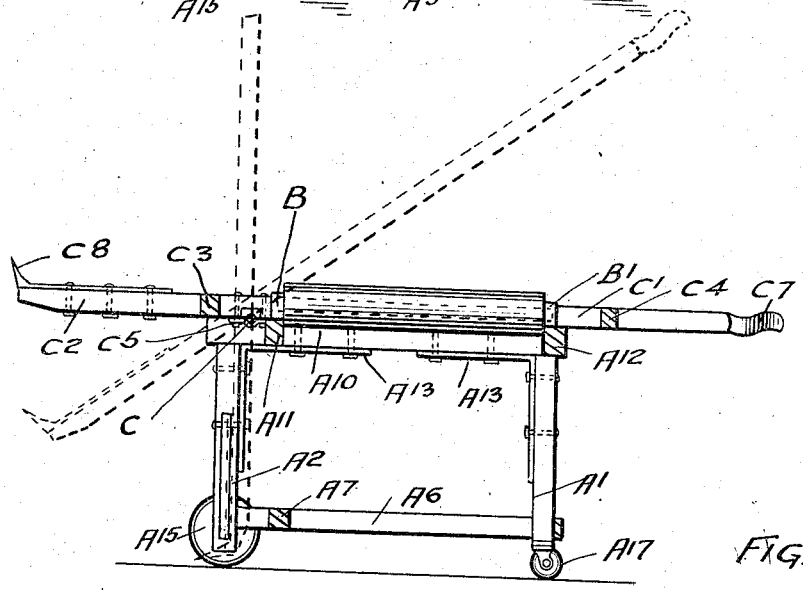
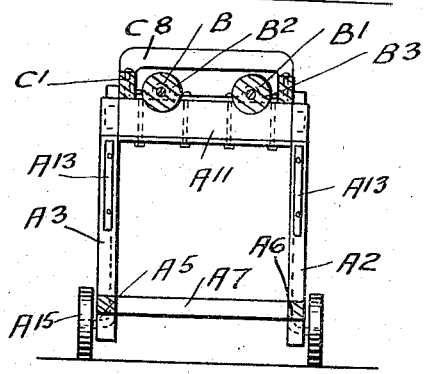

NELSON WILLIAM ALDOUS, OF TORONTO, ONTARIO, CANADA.

TRUCK.

No. 915,721.        Specification of Letters Patent.        Patented March 23, 1909.

Application filed July 30, 1908. Serial No. 446,137.

*To all whom it may concern:*

Be it known that I, NELSON WILLIAM ALDOUS, of the city of Toronto, in the county of York, in the Province of Ontario, Canada, have invented certain new and useful Improvements in Trucks, of which the following is the specification.

My invention relates to improvements in handling trucks for linoleums, oilcloths and the like and the object of the invention is to provide a simple device whereby heavy rolls of linoleum or oil cloth may be easily handled by one man so as to be brought into a position for cutting.

It consists essentially of a rectangular truck frame supported upon suitable wheels and having an open top and upwardly extending side flanges, a pair of rollers extending horizontally of the frame and journaled at each end of the frame in the open top thereof, and a pivoted frame supported in the truck frame in proximity to one end thereof and designed to normally rest on the top of the frame between the side flanges thereof, the said pivoted frame being provided at one end with a lifting handle and at the opposite end with a beveled lifting plate designed to be inserted beneath the roll when lifting the same as hereafter more particularly explained by the following specification.

Figure 1, is a general perspective view of my handling truck shown in the position it assumes when the rolls of linoleum are supported thereon for cutting. Fig. 2, is a longitudinal section view through Fig. 1. Fig. 3, is a cross sectional view through Fig. 1.

In the drawings like letters of reference indicate corresponding parts in each figure.

A is the main truck frame composed of the vertical members $A'$ $A^2$ $A^3$ and $A^4$, the lower longitudinal members $A^5$ and $A^6$, the lower cross connecting members $A^7$ and $A^8$, the upper longitudinal members $A^9$ and $A^{10}$ and the upper cross connected members $A^{11}$ and $A^{12}$. It will be seen on referring to Figs. 1 and 3 that the upper longitudinal members $A^9$ and $A^{10}$ extend upwardly above the level of the cross connecting members $A^{11}$ and $A^{12}$ thereby forming a side rib at each side of the frame. The longitudinal members $A^9$ and $A^{10}$ are connected by suitable angle brackets $A^{13}$ to the vertical members of the frame.

The frame A is supported on suitable wheels $A^{15}$ at one end thereof, and suitable caster wheels $A^{17}$ at the opposite end thereof.

B and B' are journal brackets supported upon the upper cross connecting bars $A^{11}$ and $A^{12}$. $B^2$ and $B^3$ are rollers journaled at their ends between the brackets B and B'. The rollers extend longitudinally of the frame. It will be seen on referring to Fig. 3 that these rolls $B^2$ and $B^3$ have an intervening space between them designed to receive the roll of linoleum which is supported between the rollers upon the cross connecting bars $A^{11}$ and $A^{12}$.

C is a cross rod extending between the upper longitudinal bars $A^9$ and $A^{10}$ within which it is suitably journaled. C' is a lifting frame composed of the longitudinal bars $C^2$ and cross connecting bars $C^3$ and $C^4$. The lifting frame C' is connected to the cross bar C by means of the brackets $C^5$, the lifting frame being thereby swung upon such rod. $C^7$ are lifting handles secured to or forming part of the lifting frame C' and $C^8$ is a beveled lifting lip secured to the opposite end of the lifting frame and designed to be inserted beneath the roll when the same is being lifted onto the frame.

Having described the principal parts involved in my invention I will briefly describe the operation of the same.

It will be understood that the rolls of linoleum or oilcloth when in stock are arranged in an upright position. To cut the oilcloth it is necessary to throw the roll down on the floor or other level surface.

In using my handling truck I throw the lifting frame C' into the vertical position shown by dotted lines in Fig. 2. I then push the frame forwardly against the roll so as to insert the beveled lip $C^8$ beneath the roll. I then tilt the roll against the lifting frame and pull down upon the handle $C^7$ so as to throw such frame into the horizontal position shown in the drawings. It is found by the use of my device in practice even a heavy roll may be brought into a horizontal position with one hand. By bringing the lifting frame C' into the horizontal position the roll is carried downwardly onto the cross bars $A^{11}$ and $A^{12}$ and between the rolls $B^2$ and $B^3$. The truck may then be moved to any desired position and the strip of linoleum may be drawn out from the roll to the required length for cutting.

From this description it will be seen that I have provided a very simple device whereby rolls of linoleum may be easily and expeditiously handled by one man.

What I claim as my invention is:—

1. In a handling truck for linoleum, oilcloth and the like, the combination with the main truck frame supported on suitable wheels, rollers journaled on the top of the frame and longitudinally thereof, an open lifting frame swung in proximity to its end within the main frame and designed to rest normally on the top of the main frame on a level with the longitudinal rollers as and for the purpose specified.

2. In a handling truck for linoleum, oilcloth and the like, the combination with the main rectangular frame supported on suitable wheels and having upwardly projecting members forming ribs on each end of the top of the frame, rollers journaled longitudinally of the frame between the ribs thereof, of a lifting frame pivoted in proximity to one end of the main truck frame and composed of longitudinal members designed to normally rest in a horizontal position between the side ribs of the main frame and the rollers, cross members connecting the longitudinal members of the lifting frame, a beveled inclined lip connected to one end of the lifting frame and lifting handles connected at the opposite end of the lifting frame as and for the purpose specified.

NELSON WILLIAM ALDOUS.

Witnesses:
R. COBAIN,
L. M. CLEMENT.